United States Patent [19] [11] 3,852,742
Fletcher, Jr. et al. [45] Dec. 3, 1974

[54] DIGITAL MTI CANCELLER APPARATUS USING INITIALIZATION

[75] Inventors: Robert H. Fletcher, Jr.; Donald W. Burlage, both of Huntsville, Ala.

[73] Assignee: The United States of America as represented by the Secretary of the Army, Washington, D.C.

[22] Filed: Jan. 8, 1973

[21] Appl. No.: 322,045

[52] U.S. Cl. ................................ 343/7.7, 343/5 DP
[51] Int. Cl. ............................................. G01s 9/42
[58] Field of Search .......................... 343/5 DP, 7.7

[56] References Cited
UNITED STATES PATENTS

| | | | |
|---|---|---|---|
| 3,171,118 | 2/1965 | Chambers et al. | 343/7.7 |
| 3,341,845 | 9/1967 | Deman | 343/6.8 LC |
| 3,441,932 | 4/1969 | Hamill et al. | 343/5 DP |
| 3,705,936 | 12/1972 | Wilmot et al. | 343/7.7 |

Primary Examiner—Maynard R. Wilbur
Assistant Examiner—G. E. Montone
Attorney, Agent, or Firm—Edward J. Kelly; Herbert Berl; Aubrey J. Dunn

[57] ABSTRACT

An improvement of recursive digital MTI cancellers wherein the shift registers of such cancellers are preset (in accordance with stationary interference in the radar field of view giving large echoes).

8 Claims, 2 Drawing Figures

DIGITAL MTI CANCELLER APPARATUS USING INITIALIZATION

BACKGROUND OF THE INVENTION

The use of delay line cancellers for signal processing in MTI radar is well known in the art. Both analog and digital techniques have been used. Analog cancellers were first used in scanning radars and are still so used. Digital cancellers are also used in scanning radars, but are particularly useful in phased array radars. Digital cancellers may take two forms: nonrecursive and recursive. Both of these forms include (functionally) shift registers for storing the signals, multipliers for the outputs of the register, and summers for various outputs of the registers and multipliers. Recursive cancellers differ from nonrecursive cancellers in that they include feedback loops. Such loops increase the sensitivity of recursive cancellers, but cancellers with such loops have the disadvantage that they tend to "ring" to "step" inputs resulting from stationary objects in the radar field of view giving large echoes. The instant invention obviates this disadvantage.

SUMMARY OF THE INVENTION

The invention is an improvement to a recursive digital MTI canceller using plural storage stages. In order to avoid "ringing" of the canceller from large stationary interference, the storage stages are preset or "initialized" in accordance with such unwanted targets. The target signals are sampled before any inputs are applied to the storage stages and are used to give initial counts to such stages.

DETAILED DESCRIPTION OF THE INVENTION

Figure 1:
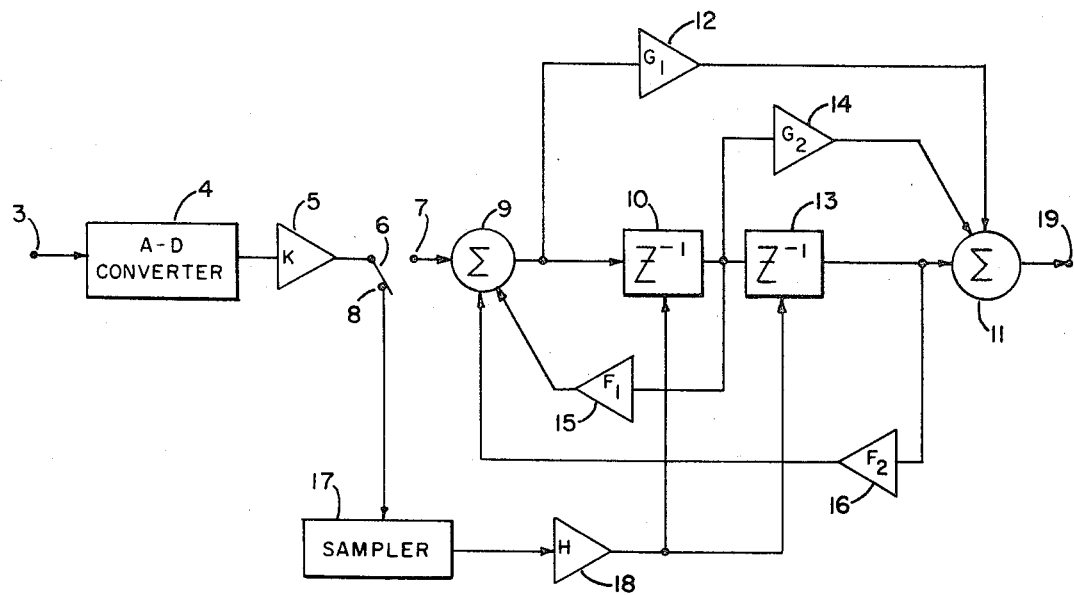
FIG. 1 shows a schematic diagram of one embodiment of the inventive apparatus.

The invention may be best understood by referring to the drawings. FIG. 1, for example, shows an embodiment wherein analog radar information is provided at terminal 3. This information is sampled and converted to a digital signal by A-D converter 4. The output of 4 is suitably amplified by amplifier 5. The signal from 5 is applied to the movable switch contact 6. This contact (or its equivalent) can be selectively connected to fixed contacts 7 or 8 (or their equivalents). Contact 7 is connected to an input of first summer 9. The output of this summer is connected to the input of storage register 10 and, through amplifier 12, to an input of summer 11. The output of 10 is connected to the input of storage register 13, through amplifier 14 to an input of summer 11, and through amplifier 15 to an input of summer 9. The output of storage register 13 is connected to an input of summer 11 and, through amplifier 16, to an input of summer 9. It should be understood the circuit thus far described (with the exceptions of 6, 7 and 8) is well known in the art and is a conventional recursive digital canceller. The addition of switch 6, 7, 8 and elements 17 and 18 make the invention. Contact 8 is connected to the input of sampler 17. This sampler samples the digital words provided by converter 4 and provides an output to amplifier 18. The output of 18 serves as an input to preset or initialize storage register 10 and 13. In the absence of the preset signals from 17, these registers would normally be set to zero before signals were processed. In order to understand the invention, it should be kept in mind that a step scan or phased array radar is providing the information to be processed in the canceller. Therefore, more than one return is available for each radar pointing position. The first N returns (N may be 1) are switched into sampler 17, and registers 10 and 13 are initialized from an average of these N returns. Switch contact 6 then moves to fixed contact 7 and signals from 4 are processed in the usual manner. Summer 11 provides the canceller output at terminal 19. This output may be converted to analog, if desired. The gains $G_1$, $G_2$, $F_1$, and $F_2$ of amplifiers 12, 14, 15, and 16 are determined from algorithms beyond the scope of this invention. However, a typical gain H for amplifier 18 of the invention is:

$$H = 1/(1-F_1-F_2).$$

Figure 2:
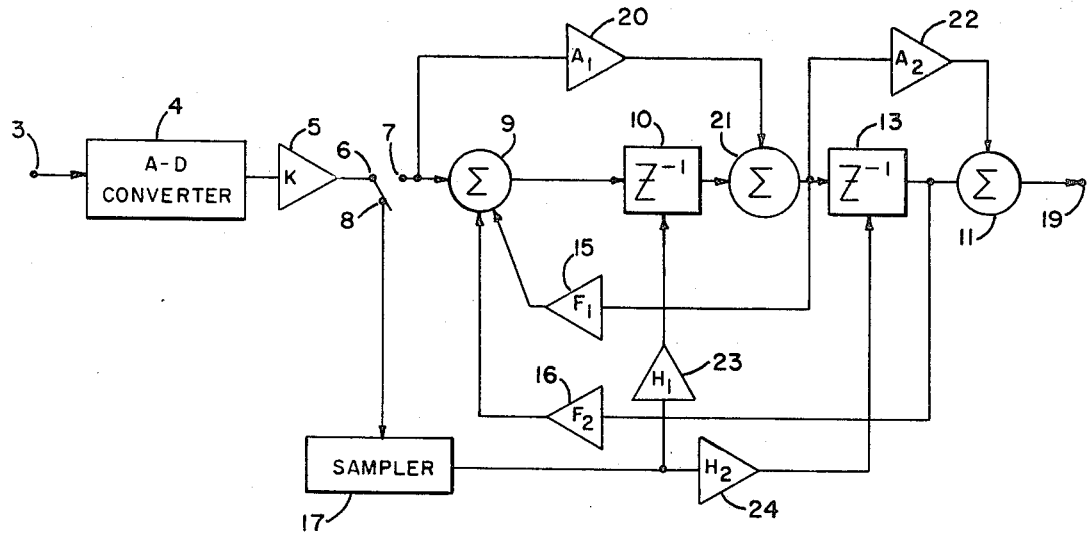
FIG. 2 shows a schematic diagram of another embodiment of the inventive apparatus.

FIG. 2 has elements common to FIG. 1, and these elements have been given the same reference numerals. FIG. 2 has an additional amplifier 20 connected between switch terminal 7 and summer 21. The output of 21 connects to an input of register 13, through amplifier 22 to summer 11, and through amplifier 15 to an input of summer 9. Registers 10 and 13 are initialized from respective amplifiers 23 and 24. Typical gains for these amplifiers are thus: $H_1 = 1$, $H_2 = 0$.

The stationary interference referred to above may arise from natural ground or weather clutter, or from artificial clutter.

It should be understood that the word amplifier as used herein more correctly should be "multiplier," since digital data is being processed. Each of the "boxes" of the figures is fed from or controlled by a clock (not shown), in the usual manner of digital circuits.

The storage registers referred to may be shift registers. While 6, 7, and 8 has been shown and described as a mechanical switch, it obviously can take many forms, and could be of a form suitable for operation by the unshown clock.

Various publications of interest in the field of this invention include: "Radar Handbook" edited by M. I. Skolnik, published by McGraw-Hill Book Company, and bearing a copyright date of 1970. Pages 17–23 to 17–30 discussed various types of cancellers. Pages 35–13 and 35–14 discuss scan modulation in MTI. The book "Digital Processing of Signals" by B. Gold and C. M. Rader, published by McGraw-Hill Book Company, and bearing a copyright date of 1969 on pages 21–23 and 36–40 explains much of the mathematics involved in prior art cancellers. Moreover, the instant inventors have an article in the December 1972 edition of the "Proceedings of the IEEE" giving a slightly different approach to the invention and giving some of the mathematics involved in determining the various gains H, $H_1$, and $H_2$. This article is entitled "An Initialization Technique for Improved MTI Performance in Phased Array Radars."

We claim:

1. A digital MTI canceller having means for converting analog radar echos into digital signals; first and second shift register storage means each having a signal input, an output, and a preset input; first and second summers each having inputs and an output; plural multipliers each having an input and an output; means connecting said output of said means for converting to an input of said first summer; wherein said output of said first summer is connected to said signal input of said first storage means and to the input of a first one of said multipliers, said output of said first storage means is connected to respective inputs of second and third multipliers and to said signal input of said second storage means, said output of said second storage means is connected to the input of a fourth multiplier and to an input of said second summer, the outputs of said first and second multipliers are connected to respective inputs of said second summer, and the outputs of said third and fourth multipliers are connected to respective inputs of said first summer, the improvement comprising: initialization means having an input and an output, with said input connected to said means connecting; and additional means for connecting said output of said initialization means to said preset inputs of said storage means; wherein said output of said second summer is the output of the canceller.

2. The canceller as set forth in claim 1 wherein said additional means connecting includes switch means having an input connected to said means for converting and having first and second outputs respectively connected to the input of said first summer and to the input of said initialization means.

3. The canceller as set forth in claim 1 wherein said initialization means includes a sampler.

4. The canceller as set forth in claim 1 wherein said third and fourth multipliers have respective multiplication factors of $F_1$ and $F_2$; and said third means for connecting includes a multiplier having a multiplication factor H equal to $1/(1-F_1-F_2)$.

5. A digital MTI canceller having means for converting analog radar echos into digital signals; first and second shift register storage means each having a signal input, an output, and a preset input, first, second and third summers each having inputs and an output; plural multipliers each having an input and an output; means connecting said output of said means for converting to an input of said first summer and to an input of a first multiplier; wherein said output of said first summer is connected to said signal input of said first storage means, said output of said first storage means and the output of said first multiplier are connected to respective inputs of said second summer, the output of said second summer is connected to the inputs of second and third multipliers and to the signal input of said second storage means, the output of said second storage means is connected to a first input of said third summer and the input of a fourth multiplier, said output of said second multiplier is connected to a second input of said third summer, and the output of said third and fourth multipliers are connected to respective inputs of said first summer, the improvement comprising: initialization means having an input and an output, with said input connected to said means connecting; and additional means for connecting said output of said initialization means to said preset inputs of said storage means; wherein said output of said third summer is the output of the canceller.

6. The canceller as set forth in claim 5 wherein said additional means connecting includes two multipliers respectively connected to said storage means, and said multipliers have respective multiplication factors of 1 and 0.

7. The canceller as set forth in claim 5 wherein said additional means connecting includes switch means having an input connected to said means for converting and having first and second outputs respectively connected to the input of said first summer and to the input of said initialization means.

8. The canceller as set forth in claim 5 wherein said initialization means includes a sampler.

* * * * *